United States Patent
Hoke

[15] 3,686,306
[45] Aug. 22, 1972

[54] HALOGEN-SUBSTITUTED DERIVATIVES OF N-3-OXOHYDROCARBONSUBSTITUTED ACRYLAMIDES

[72] Inventor: Donald Irvin Hoke, Chagrin Falls, Ohio

[73] Assignee: The Lubrizol Corporation, Wickliffe, Ohio

[22] Filed: Dec. 10, 1970

[21] Appl. No.: 97,055

[52] U.S. Cl. ............260/561 N, 260/66, 260/78.5 R, 260/80.3 N, 260/85.5 AM, 260/85.7, 260/87.5 R, 260/88.1 PN, 260/89.7 R, 260/561 HL, 260/562 B
[51] Int. Cl. ..........................................C07c 103/30
[58] Field of Search....................260/561 N, 561 HL Primary Examiner—Lewis Gotts
Assistant Examiner—Ethel G. Love
Attorney—Roger Y. K. Hsu, William H. Pittman and James W. Adams, Jr.

[57] ABSTRACT

Halogenation of N-3-oxohydrocarbon-substituted acrylamides, such as diacetone acrylamide, produces the corresponding substituted 2,3-dihalopropionamides. These can in turn be dehydrohalogenated to give the corresponding substituted 2-haloacrylamides. The latter compounds may also be prepared by the reaction of two moles of an aldehyde or ketone, or one mole of a $\beta$-hydroxy aldehyde or ketone or an $\alpha,\beta$-unsubstituted aldehyde or ketone, with 2-chloroacrylonitrile in the presence of sulfuric acid. The substituted 2-chloroacrylamides are useful as monomers for the preparation of fire-resistant polymers.

10 Claims, No Drawings

HALOGEN-SUBSTITUTED DERIVATIVES OF N-3-OXOHYDROCARBONSUBSTITUTED ACRYLAMIDES

This invention relates to new compositions of matter and to methods for their preparation. More specifically, it relates to compounds of the formula

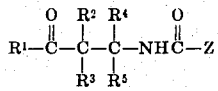

wherein each of $R^1$, $R^2$, $R^3$, $R^4$ and $R^5$ is hydrogen or a hydrocarbon or substituted hydrocarbon radical and Z is

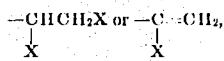

The term "hydrocarbon radical" as used herein includes aliphatic, cycloaliphatic and aromatic (including aliphatic- and cycloaliphatic-substituted aromatic and aromatic-substituted aliphatic and cycloaliphatic) radicals. It also includes cyclic radicals wherein the ring is completed through another portion of the molecule; that is, any two indicated substituents may together form a cycloalkyl radical.

The following are illustrative of hydrocarbon radicals within the scope of this invention. Where a named radical has several isomeric forms (e.g., butyl), all such forms are included.

| | |
|---|---|
| Methyl | Benzyl |
| Ethyl | Cyclohexyl |
| Propyl | Cyclopentyl |
| Butyl | Methylcyclopentyl |
| Hexyl | Cyclopentadienyl |
| Octyl | Vinylphenyl |
| Decyl | Isopropenylphenyl |
| Vinyl | Cinnamyl |
| Allyl | Naphthyl |

Ethynyl
Propargyl
Phenyl
Tolyl
Xylyl
—$C_6H_3(C_2H_5)_2$
—$C_6H_4(CH_2)_{11}CH_3$

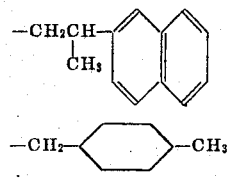

Many obvious variations of these radicals will be apparent to those skilled in the art and are included within the scope of the invention.

Substituted hydrocarbon, alkyl, aryl, etc., radicals are considered fully equivalent to the hydrocarbon, alkyl, aryl, etc., radicals and to be part of this invention. By "substituted" is meant radicals containing substituents which do not alter significantly the character or reactivity of the radical. Examples are:
Halide (fluoride, chloride, bromide, iodide)
Hydroxy
Ether (especially lower alkoxy)
Keto
Carboxy
Ester (especially lower carbalkoxy)
Aminoacyl (amide)
Nitro
Cyano
Mercapto
Thioether
Sulfoxy
Sulfone
Sulfonic acid ester and amide In general, no more than about three such substituent groups will be present for each 10 carbon atoms in the radical.

The hydrocarbon or substituted hydrocarbon radicals in the compounds of this invention are usually free from ethylenic and acetylenic unsaturation and have no more than about 30 carbon atoms, desirably no more than about 12 carbon atoms. They are generally lower hydrocarbon radicals, the word "lower" denoting radicals containing up to seven carbon atoms, and especially lower alkyl or aryl radicals, most often alkyl.

In the preferred compounds of this invention, each of $R^1$, $R^4$ and $R^5$ is a lower alkyl radical and $R^2$ and $R^3$ are hydrogen. The radical X is halogen (fluorine, chlorine, bromine or iodine), usually chlorine or bromine and preferably chlorine.

The following are illustrative of the compounds of this invention.

N-(1,1-Dimethyl-3-oxobutyl)-2,3-dichloropropionamide

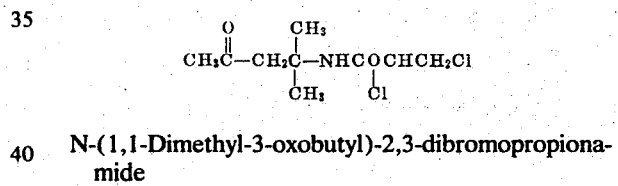

N-(1,1-Dimethyl-3-oxobutyl)-2,3-dibromopropionamide

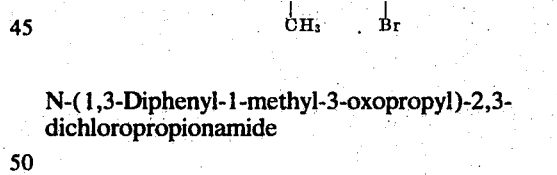

N-(1,3-Diphenyl-1-methyl-3-oxopropyl)-2,3-dichloropropionamide

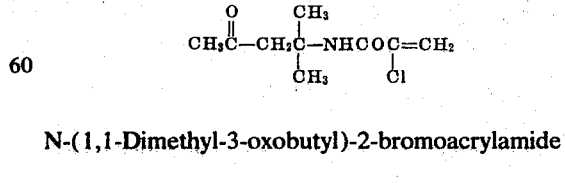

N-(1,1-Dimethyl-3-oxobutyl)-2-chloroacrylamide $$CH_3\overset{O}{\underset{}{C}}-CH_2\overset{CH_3}{\underset{CH_3}{C}}-NHCOC=CH_2 \quad \underset{Cl}{}$$

N-(1,1-Dimethyl-3-oxobutyl)-2-bromoacrylamide $$CH_3\overset{O}{\underset{}{C}}-CH_2\overset{CH_3}{\underset{CH_3}{C}}-NHCOC=CH_2 \quad \underset{Br}{}$$

N-(1,3-Diphenyl-1-methyl-3-oxopropyl)-2-chloroacrylamide

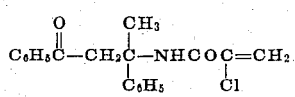

Compounds of this invention wherein Z is

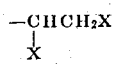

may be prepared by halogenation of the corresponding substituted acrylamides. Any of the ordinary methods for halogenation of olefinic bonds may be employed. The preferred methods employ either a sulfuryl halide or a solution of the halogen in pyridine or a similar amine. The halogenation reaction takes place under mild conditions and the halogenation product may be easily isolated by removal of any solvent which may be present and purified by distillation, recrystallization or the like.

Compounds according to this invention wherein Z is

may be prepared by either of at least two methods. The first is dehydrohalogenation of compounds wherein Z is

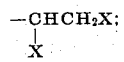

such dehydrohalogenation is conveniently effected by a basic reagent such as an alkali metal hydroxide, alkoxide or the like.

The second method is the reaction of one mole of α-chloroacrylonitrile with two moles of a ketone or aldehyde having at least one alpha-hydrogen atom, or with one mole of a 3-oxoalcohol or corresponding α,β-unsaturated ketone or aldehyde, in the presence of at least one mole of sulfuric acid per mole of α-chloroacrylonitrile. This method is identical, except for the starting nitrile, with the method for the preparation of N-3-oxohydrocarbon-substituted acrylamides disclosed and claimed in U.S. Pat. Nos. 3,277,056 and 3,425,942. The disclosures of both of these patents are incorporated by reference herein.

The preparation of the compounds of this invention is illustrated by the following examples. All parts and percentages are by weight.

EXAMPLE 1

A solution of 84.5 parts (0.5 mole) of diacetone acrylamide in 50 parts of pyridine is held at 20°–30° C. by external cooling and 44 parts (0.62 mole) of chlorine is added by bubbling the same into the solution. The mixture becomes very viscous during the chlorine addition. Water, 150 parts, is added and the mixture is allowed to stand, whereupon the product solidifies. It is removed by filtration, washed with water and recrystallized from textile spirits. The desired N-(1,1-dimethyl-3-oxobutyl)-2,3-dichloropropionamide melts at 81.8°–82.8° C. and contains 5.75 percent nitrogen (theory 5.83 percent) and 29.4 percent chlorine (theory 29.6 percent).

EXAMPLE 2

Following the procedure of Example 1, 0.5 mole of diacetophenone acrylamide is reacted with 0.65 mole of chlorine. The product is N-(1,3-diphenyl-1-methyl-3-oxopropyl)-2,3-dichloropropionamide.

EXAMPLE 3

To a solution of 16.9 grams (0.1 mole) of diacetone acrylamide in 100 ml. of benzene are added, simultaneously but from separate vessels, 13.5 grams (0.1 mole) of sulfuryl chloride and 7.9 grams of pyridine. An exothermic reaction occurs which causes the temperature to rise to 38° C.; to avoid a further rise in temperature, the reaction vessel is cooled externally. The mixture is allowed to stand at room temperature for 16 ½ hours and the benzene is removed by evaporation. To the product is added 20 ml. of water and the mixture is extracted with chloroform. Upon evaporation of the chloroform and recrystallization of the solid product from toluene, there is obtained the desired N-(1,1-dimethyl-3-oxobutyl)-2,3-dichloropropionamide.

EXAMPLE 4

N-(1,1-dimethyl-3-oxobutyl)-2,3-dichloropropionamide, 24 grams (0.1 mole), is dissolved in 125 ml. of toluene and added to a solution of potassium t-butoxide prepared from 4 grams (0.1 gram-atom) of potassium and 50 ml. of t-butyl alcohol. The mixture is stirred at 60° C. for 2 ½ hours and at room temperature for 17 ½ hours. The toluene is then removed by distillation, 100 ml. of acetone is added and the solution is filtered. Upon removal of the acetone and distillation, the desired N-(1,1-dimethyl-3-oxobutyl)-2-chloroacrylamide is obtained boiling at 70°–75° C./0.2–0.3 torr.

EXAMPLE 5

Following the procedure of Example 4, N-(1,3-diphenyl-1-methyl-3-oxopropyl)-2-chloroacrylamide is prepared from N-(1,3-diphenyl-1-methyl-3-oxopropyl)-2,3-dichloropropionamide.

EXAMPLE 6

Sulfuric acid, 400 parts (4 moles), is added over 20 minutes to a mixture of 175 parts (2 moles) of α-chloroacrylonitrile and 232 parts (4 moles) of acetone, with stirring. The reaction temperature is kept at 20°–28 C. by external cooling. After sulfuric acid addition is complete, external cooling is discontinued whereupon a exothermic reaction occurs and the temperature rises to about 48° C. The mixture is stirred for 1 hour and is then poured over crushed ice and neutralized with aqueous ammonium hydroxide. The organic layer is removed and the aqueous layer is extracted with benzene. The organic layer and benzene extracts are combined, washed with saturated aqueous sodium chloride solution and dried over magnesium sulfate. The solvents are removed by vacuum evaporation and the product is distilled, yielding the desired N-(1,1-dimethyl-3-oxobutyl)-2-chloroacrylamide. The product contains 6.73 percent nitrogen (theory 6.89 percent) and 17.5 chlorine (theory 17.45 percent).

EXAMPLE 7

Following the procedure of Example 6, N-(1,3-diphenyl-1-methyl-3-oxopropyl)-2-chloroacrylamide is prepared by reacting 2 moles of α-chloroacrylonitrile with 4 moles of acetophenone and 4 moles of sulfuric acid.

EXAMPLE 8

α-Chloroacrylonitrile, 350 grams (4 moles), is added slowly to 850 grams (8.5 moles) of sulfuric acid at 10°–20 C. Diacetone alcohol, 464 grams (4 moles), is then added dropwise over 1 ¾ hours, also at 10°–20° C. the reaction is very exothermic and external cooling is necessary. The mixture is stirred for 15 minutes at 10°–15 C. and allowed to stand overnight at room temperature. It is then poured onto crushed ice and neutralized with aqueous ammonium hydroxide. Toluene, 350 ml., is added and the organic layer is separated, washed with saturated aqueous sodium chloride solution and dried over magnesium sulfate. The toluene is removed and the desired N-(1,1-dimethyl-3-oxobutyl)-2-chloroacrylamide is recovered by distillation as described in Example 6.

Compounds of this invention wherein Z is

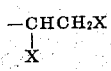

are useful chiefly as chemical intermediates for the preparation of compounds wherein Z is

as illustrated by Examples 4 and 5 hereinabove.

Compounds of this invention wherein Z is

are readily polymerized under free-radical or anionic conditions, either alone or with other monomers. The term "polymer", as used herein, includes homopolymers, copolymers, terpolymers and other interpolymers.

The free-radical method is generally the most convenient one for polymerization of the compounds of this invention. Polymerization by this method may be effected in bulk, solution, suspension or emulsion, by contacting the monomer or monomers with a polymerization initiator either in the absence of presence of a diluent at a temperature of about 0°–200° C. Suitable free-radical initiators include benzoyl peroxide, tertiary butyl hydroperoxide, acetyl peroxide, hydrogen peroxide, azobisisobutyronitrile, sodium persulfate, ammonium persulfate-sodium metabisulfite, chlorate-sulfite and the like. Solution polymerization may be effected in an organic solvent such as benzene, toluene, cyclohexane, n-hexane, naphtha, tetrahydrofuran, mineral oil or the like; emulsion and suspension polymerization are conveniently effected in water or a mixture of water with a hydroxylated organic solvent.

Suitable emulsifiers for use in the preparation of emulsion polymers of this invention include cationic materials such as stearyl dimethyl benzyl ammonium chloride; non-ionic materials such as alkyl aryl polyether alcohols and sorbitan mono-oleate; anionic materials such as sodium decylbenzene sulfonate, dioctyl sodium sulfosuccinate, sodium salts of alkyl aryl polyether sulfates, and sodium lauryl sulfate; alkali metal salts of lignosulfonic acids, silicic acids and the like; and colloidal materials such as casein, sodium polyacrylate, carboxymethylcellulose, hydroxyethylcellulose, gum tragacanth, sodium alginate, gelatin, methylcellulose; gum arabic, dextrins or polyvinyl alcohol.

The compounds of this invention may also be polymerized under anionic conditions using an initiator such as butyllithium or naphthylsodium in tetrahydrofuran, or sodium metal in liquid ammonia.

A large variety of monomers can be used to form interpolymers with the compounds of this invention. For the most part, these monomers are polymerizable vinyl compounds. They include (1) esters of unsaturated alcohols, (2) esters of unsaturated acids, (3) esters of unsaturated polyhydric alcohols, (4) vinyl cyclic compounds, (5) unsaturated ethers, (6) unsaturated ketones, (7) unsaturated amides, (8) unsaturated aliphatic hydrocarbons, (9) vinyl halides, (10) unsaturated acids, (11) unsaturated acid anhydrides, (12) unsaturated acid chlorides, and (13) unsaturated nitriles. Specific illustrations of such compounds are:

1. Esters of unsaturated alcohols: Allyl, methallyl, crotyl, 1-chloroallyl, 2-chloroallyl, cinnamyl, vinyl, methylvinyl, 1-phenallyl, butenyl esters of (a) saturated acids such as acetic, propionic, butyric, valeric, caproic and stearic; (b) unsaturated acids such as acrylic, alpha-substituted acrylic (including alkylacrylic, e.g., methacrylic, ethylacrylic, propylacrylic, etc., and arylacrylic such as phenylacrylic), crotonic, oleic, linoleic and linolenic; (c) polybasic acids such as oxalic, malonic, succinic, glutaric, adipic, pimelic, suberic, azelaic and sebacic; (d) unsaturated polybasic acids such as maleic, fumaric, citraconic, mesaconic, itaconic, methylenemalonic, acetylenedicarboxylic and aconitic; (e) aromatic acids, e.g., benzoic, phenylacetic, phthalic, terephthalic and benzoylphthalic acids.

2. Esters of saturated alcohols, such as methyl, ethyl, propyl, isopropyl, butyl, isobutyl, sec-butyl, tertbutyl, 2-ethylhexyl, cyclohexyl or behenyl alcohols, with unsaturated aliphatic monobasic and polybasic acids, examples of which are illustrated above.

3. Esters of unsaturated polyhydric alcohols, e.g., butenediol, with saturated and unsaturated aliphatic and aromatic, monobasic and polybasic acids, illustrative examples of which appear above.

4. Vinyl cyclic compounds including (a) monovinyl aromatic hydrocarbons, e.g., allylbenzene, styrene, o-, m-, p- chlorostyrenes, -bromostyrenes, -fluorostyrenes, -methylstyrenes, -ethylstyrenes, -cyanostyrenes; di-, tri-, and tetra-, etc., -chlorostyrenes, -bromostyrenes, -fluorostyrenes, -methylstyrenes, -ethylstyrenes, -cyanostyrenes; vinylnaphthalene, vinylcyclohexane; (b) corresponding polyvinyl compounds such as divinylbenzene and trivinylbenzene; and (c) vinyl heterocycles such as vinylfuran, vinylpyridine, vinylbenzofuran, N-vinylcarbazole, N-vinylpyrrolidone, N-vinylthiopyrrolidone and N-vinyloxazolidone.

5. Unsaturated ethers such as methyl vinyl ether, ethyl vinyl ether, cyclohexyl vinyl ether, octyl vinyl ether, diallyl ether, ethyl methallyl ether and allyl ethyl ether.

6. Unsaturated ketones, e.g., methyl vinyl ketone and ethyl vinyl ketone.

7. Unsaturated amides, such as acrylamide, methacrylamide, N-methylacrylamide, N-phenylacrylamide, N-allylacrylamide, N-methylolacrylamide, N-allylcaprolactam, diacetone acrylamide, N-(1,1-dimethyl-3-hydroxybutyl)acrylamide and 2-acrylamido-2-methylpropanesulfonic acid.

8. Unsaturated aliphatic hydrocarbons, for instance, ethylene, propylene, butenes, butadiene, isoprene, 2-chlorobutadiene and alpha-olefins in general.

9. Vinyl halides, e.g., vinyl fluoride, vinyl chloride, vinyl bromide, vinylidene chloride, vinylidene bromide, allyl chloride and allyl bromide.

10. Unsaturated acids (for example, acrylic, methacrylic, propylacrylic), examples of which appear above.

11. Unsaturated acid anhydrides, e.g., maleic, citraconic, itaconic, cis-4-cyclohexene-1,2-dicarboxylic and bicyclo(2,2,1)-5-heptene-2,3-dicarboxylic anhydrides.

12. Unsaturated acid halides such as cinnamoyl, acrylyl, methacrylyl, crotonyl, oleyl and fumaryl chlorides or bromides.

13. Unsaturated nitriles, e.g., acrylonitrile, methacrylonitrile and other substituted acrylonitriles.

The relative proportions of the compounds of this invention and the comonomers to be used in interpolymerization depend upon the reactivity of these monomers as well as the properties desired for the interpolymers being formed. To illustrate, interpolymers in which rigidity is desired are obtained by polymerization of a mixture of monomers having a few substitutions or substitutions of relatively short chain length. If a still higher degree of rigidity is desired, a monomer mixture may be used in which a small amount of a bifunctional monomer is included such as divinylbenzene which will crosslink the polymer. On the other hand, interpolymers which are soluble in hydrocarbon oils may be obtained by polymerization of a monomer mixture containing a relatively high proportion of an oil-solubilizing monomer, i.e., one having an aliphatic group containing at least about eight carbon atoms.

The preparation of polymers of the compounds of this invention is illustrated by the following examples.

EXAMPLE 9

A solution of 28 parts of N-(1,1-dimethyl-3-oxobutyl)-2-chloroacrylamide and 0.1 part of azobisisobutyronitrile in 50 parts of benzene is agitated at 60° C. under nitrogen for 18 hours. The desired homopolymer precipitates and is recovered, washed with textile spirits, dissolved in methanol and precipitated by pouring into water. The precipitated homopolymer is dried in a vacuum oven.

EXAMPLE 10

Following the procedure of Example 9, a copolymer is prepared from 14 parts of N-(1,1-dimethyl-3-oxobutyl)-2-chloroacrylamide, 14 parts of ethyl vinyl ether, 0.1 part of azobisisobutyronitrile and 50 parts of benzene. The copolymer is recovered by pouring the benzene solution into textile spirits and is then reprecipitated from benzene with textile spirits and dried in a vacuum oven.

EXAMPLE 11

Following the procedure of Example 10, a copolymer is prepared from 14 parts of N-(1,1-dimethyl-3-oxobutyl)-2-chloroacrylamide and 14 parts of methyl methacrylate.

EXAMPLE 12

Following the procedure of Example 10, a copolymer containing equal proportions of N-(1,1-dimethyl-3-oxobutyl)-2-chloroacrylamide and styrene is prepared and isolated.

EXAMPLE 13

Following the procedure of Example 9, a copolymer is prepared and isolated from 14 parts of N-(1,1-dimethyl-3-oxobutyl)-2-chloroacrylamide and 14 parts of vinyl acetate.

EXAMPLE 14

Following the procedure of Example 10, a copolymer is prepared from equal weights of N-(1,1-dimethyl-3-oxobutyl)-2-chloroacrylamide and methyl vinyl ketone.

Polymers of the compounds of this invention have properties similar to those of polymers of the N-3-oxohydrocarbon-substituted acrylamides disclosed and claimed in the aforementioned U.S. Pat. Nos. 3,277,056 and 3,425,942. They also have the additional property of improved fire resistance, owing to the presence of the chlorine atom in the molecule. Thus, it will be appreciated that these polymers can be employed in the same way as polymers of the N-3-oxohydrocarbon-substituted acrylamides when fire resistance is necessary in addition to the other desirable properties of such polymers. These uses are readily apparent, e.g., from U.S. Pat. Nos. 3,454,669; 3,458,478; 3,497,467; 3,518,326; and 3,520,804, all of which are incorporated by reference herein.

What is claimed is:

1. A compound of the formula

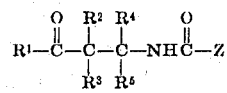

wherein each of $R^1$, $R^2$, $R^3$, $R^4$ and $R^5$ is hydrogen or a hydrocarbon radical and Z is

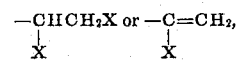

X being halogen.

2. A compound according to claim 1 wherein X is chlorine.

3. A compound according to claim 2 wherein Z is

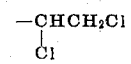

4. A compound according to claim 3 wherein each of $R^1$, $R^2$, $R^3$, $R^4$ and $R^5$ is hydrogen or a lower alkyl radical.

5. A compound according to claim 4 wherein each of $R^1$, $R^4$ and $R^5$ is a lower alkyl radical and $R^2$ and $R^3$ are hydrogen.

6. A compound according to claim 5 wherein each of $R^1$, $R^4$ and $R^5$ is methyl.

7. A compound according to claim 2 wherein Z is

8. A compound according to claim 7 wherein each of $R^1$, $R^2$, $R^3$, $R^4$ and $R^5$ is hydrogen or a lower alkyl radical.

9. A compound according to claim 8 wherein each of $R^1$, $R^4$ and $R^5$ is a lower alkyl radical and $R^2$ and $R^3$ are hydrogen.

10. A compound according to claim 9 wherein each of $R^1$, $R^4$ and $R^5$ is methyl.

* * * * *